Oct. 16, 1962 D. D. TAYLOR 3,058,750
METHOD OF APPLYING A SEALING WITH C-SHAPED RADIAL SECTION
Filed March 4, 1959 3 Sheets-Sheet 1
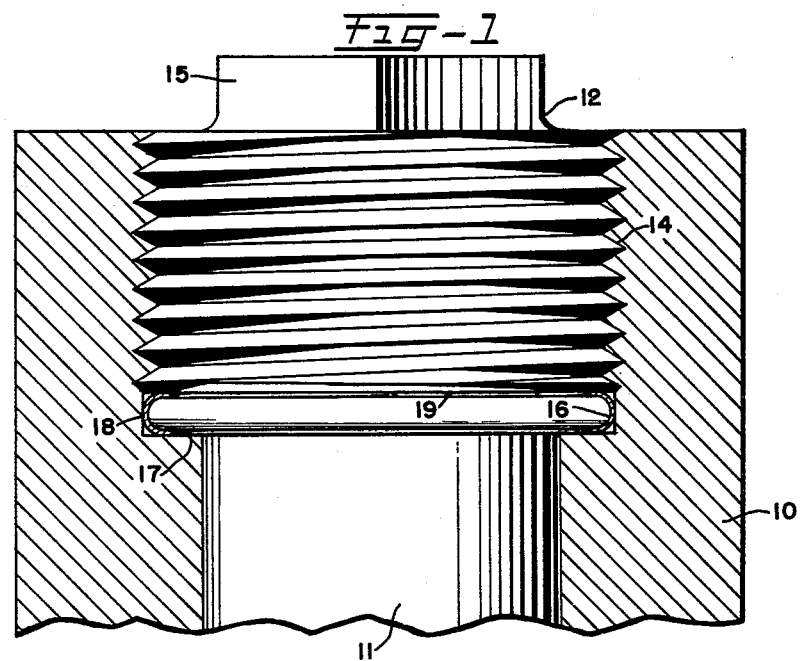
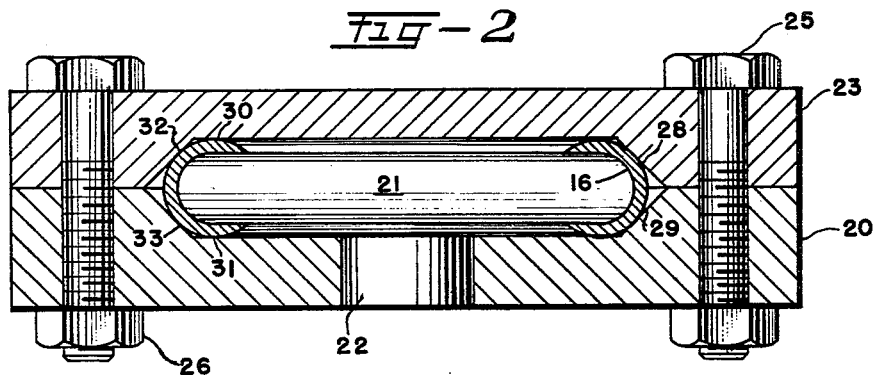
INVENTOR
DUDLEY D. TAYLOR
BY Henry H Snelling
ATTORNEY Oct. 16, 1962  D. D. TAYLOR  3,058,750
METHOD OF APPLYING A SEALING WITH C-SHAPED RADIAL SECTION
Filed March 4, 1959  3 Sheets-Sheet 2

INVENTOR
DUDLEY D. TAYLOR

BY Henry H Snelling
ATTORNEY

Oct. 16, 1962 D. D. TAYLOR 3,058,750
METHOD OF APPLYING A SEALING WITH C-SHAPED RADIAL SECTION
Filed March 4, 1959 3 Sheets-Sheet 3

INVENTOR
DUDLEY D. TAYLOR

BY Henry H Snelling
ATTORNEY

3,058,750
METHOD OF APPLYING A SEALING WITH C-SHAPED RADIAL SECTION

Dudley D. Taylor, 11623 35th Place, Beltsville, Md.
Filed Mar. 4, 1959, Ser. No. 797,155
1 Claim. (Cl. 277—1)

This invention relates to sealing rings and has for its principal object the provision of a ring which is capable of holding pressures running to 100,000 p.s.i. or higher for long periods of time and is suitable for repeated re-use.

A further object of the invention is to produce a sealing ring C-shaped in radial section adaptable for use where U-shaped rings have previously been employed, which C-rings permit a greatly increased initial contact pressure between the ring and the holding body, but over a minimum area and permits a rapid change of shape of the cross-section of the ring as the pressure of the confined gas or liquid is increased with an increase in the contact area between the sealing ring and the two bodies forming the pressure chamber.

A still further object of the invention is to provide a C-shaped ring sufficiently ductile as to alter in cross-section under pressure, of high tensile strength, resistant to corrosive action, and having a thermal expansion with a suitable relation to the thermal expansion of the material of the body in which the pressure chamber is located.

An important object of the invention is to form a pressure vessel sealing joint construction in which the contact pressure between the sealing ring and the surfaces of the two or more portions of the containing housing or vessel is greater than the pressure exerted against the seal and the vessel by the medium being sealed, and that either the material of the containing housing or of the seal shall be stressed beyond its elastic limit so that one or the other of the materials shall deform to a degree as to fill any and all surface irregularities in the areas of contact of the sealing ring and thereby eliminate possibility of passage of the confined medium across the seal joint.

The object immediately above requires that the sealing ring which is C-shaped in radial section shall initially be given a clamping force sufficient to obtain an initial seal along two paths of contact spaced from the back of the ring and the slot or mouth opening and that the pressure exerted by the confined medium within the hollow of the sealing ring shall further deform the radial section, the material of the ring being flexible to an extent that as the housing is strained the ring will follow such deflection of the housing while maintaining the effective leak-proof seal under the pressures recited.

Sealing rings are made of a considerable number of forms, these including rings having an O-shaped radial section but more usually having a U-shaped cross section. The O-shaped rings are frequently pressure filled, as otherwise they are able to offer only slight resistance to crushing pressures.

In airplane work particularly, sealing rings have been used with an O-shaped radial section with one or more tiny holes to permit the pressure exerted on the side of the ring to pass to the interior. The present invention differs from such a ring in a number of points, probably the most important being that the C-shaped ring of the present invention is originally applied with a contact pressure exceeding the yield strength of the material of the ring or the material of the body so that one or the other of these deforms and therefore fills or seals any surface irregularity in the other. The present ring may increase in its outer diameter in accordance with increase in pressure in the pressure chamber being sealed, and will engage with a greater area the mechanical support, the C-rings requiring at least three points of contact with the bodies forming the pressure chamber, two points of contact being for the confining or contact pressure and a third being a surface which limits radial expansion of the ring.

In the drawings:

FIG. 1 is a section through a simple but characteristic installation.

FIG. 2 is a somewhat similar view, but showing the C-ring having two mechanical support contact lines or areas.

Figure 3:
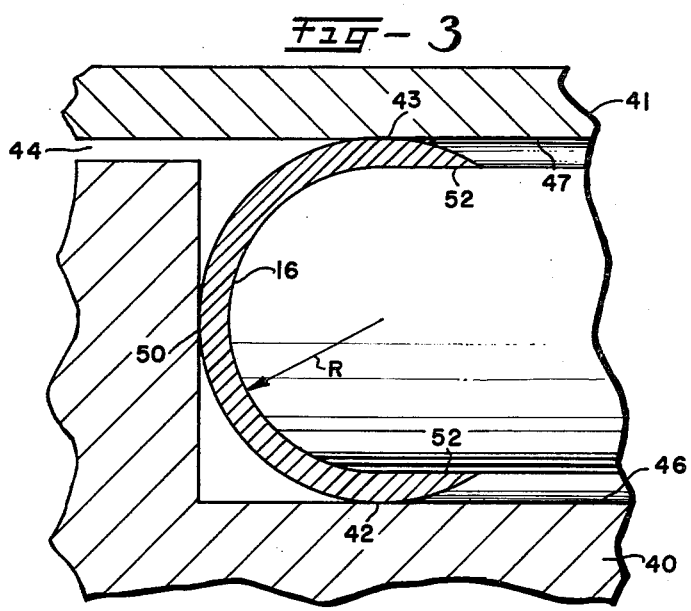
FIG. 3 shows a C-ring as first seated.

In FIG. 1 the pressure vessel 10 has a chamber 11 closed by a plug 12 threaded as at 14 and having a square head 15. The sealing ring 16 rests in a groove or annular recess formed by a flat face 17 and a cylindrical surface 18, the latter being coaxial with the chamber 11 while the face 17 lies in a plane perpendicular to the common axis. The bottom face 19 of the closure plug 12 is parallel to the face 17 forming the bottom of the groove in the housing or pressure vessel 10. The sealing ring 16 before the closure plug 12 is tightened has a snug engagement at its back with the wall 18 but such contact is best of small area, preferably being a mere line contact upon initial placement. The particular device illustrated in the figure was repeatedly tested at temperatures from −30° C. to 90° C., raising and lowering the pressure hundreds of times and opening the vessel many times between tests without a single leak or replacement of the seal or other part. It was also tested to seal dynamic pressures generated by explosive charges. The sealing ring was of stainless steel and the pressure vessel including the closure plug was of SAE 4340.

In FIG. 2 the housing 20 has a central recess 21 communicating with an entry port 22 through which fluid under pressure is admitted to the recess 21 covered by closure plate 23 in smooth contact with the housing 20 and so held by a series of bolts 25 and nuts 26. The groove in this case has sloping faces 28 and 29 instead of the cylindrical surface 18 as in FIG. 1 and consequently the sealing ring 16 has two line contacts 30 and 31 with the closure and housing, respectively, as in FIG. 1, but has two lines or areas 32 and 33 of mechanical support to limit the expansion of the outer diameter of the ring, whereas the ring when used with a cylindrical groove has but the one line of rear contact.

Figure 4:
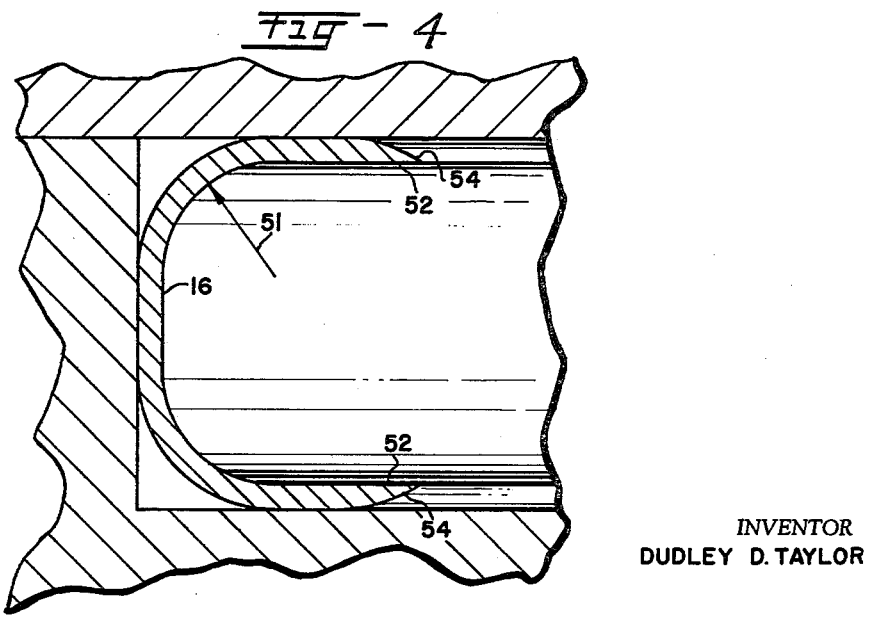
FIG. 4 is a similar view, but showing the same ring under greater pressure.

FIGS. 3 and 4 show the sealing ring as initially seated and as under great pressure, respectively. The housing is here numbered 40, the closure 41, but the sealing ring keeps its numeral 16. The outer diameter of the ring is initially slightly greater than the depth of the groove as indicated by the space 44 between the housing and the closure plate 41. At this time the sealing ring is in line contact 42 with the bottom 46 of the groove and in line contact 43 with the plane face 47 of the closure plate 41. The bolts, such as 25, are now tightened to give the desired contact pressure which is greater than the pressure to be maintained in the confined fluid. This increases the contact area at both 42 and 43 and also at the back of the ring at 50 if the ring were in snug engagement with the cylindrical wall of the groove. Increase of pressure on the confined fluid will still further increase the areas of contact at the top, the bottom and the back of the ring as in FIG. 4 so the radius of curvature, initially half the inside diameter of the ring now becomes shorter as at 51 and the ring consequently will support a still higher pressure differential when in the yielded configuration shown in this figure.

Figure 6:
FIG. 6 shows a cross section of a C-ring formed other than by machining.

The sealing ring 16 is preferably machined from a solid annulus of appropriate material, such as brass, aluminum, copper and its alloys, such as beryllium but preferably of stainless steel, type 308 being excellent as it has a large coefficient of thermal expansion, is ductile to the desired degree and is highly resistant to the corrosive action of most acids, salts, and of molten metal. Rings of Teflon and Delrin plastic are suitable for certain uses. When machined, the slot or mouth opening 52 is preferably exactly equal to the internal diameter of the ring and the latter is at least 75% of the outside diameter, a common radial thickness of the sealing ring being 1/7 of the outer diameter. The sides of the cusps 54 therefore form small angles. The surface finish is of great importance, especially when the sealing ring slidingly engages a co-operating cylindrical surface. Rings have been formed by dies which apply an axial force to a thin walled cylinder as a hydrostatic pressure generated inside the cylinder pushes the metal into the die contour, rubber being a convenient pressure transmitting medium. Another method of making the sealing ring is to roll the ring. Two rollers are grooved to form the outer surface while the third roller forms the inner surface. After rolling, the mouth 52a of the ring 16a is closed by a die thus producing the cross-section shown in FIG. 6.

Figure 5:
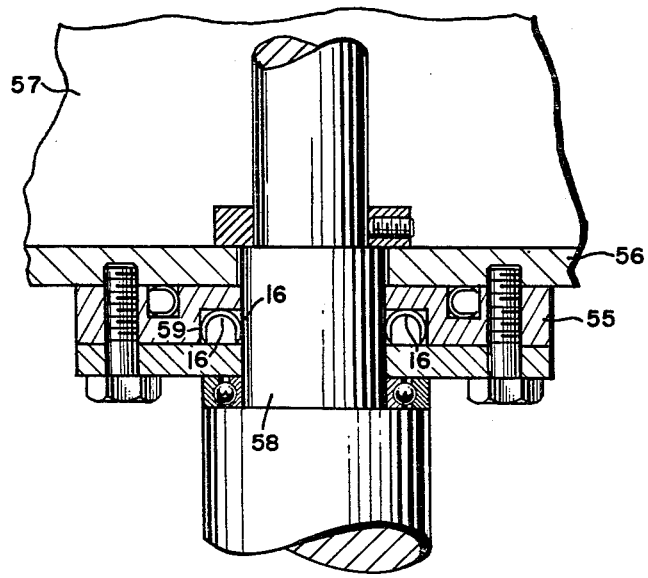
FIG. 5 is a view showing application of a C-ring to a moving body.

In FIG. 5 the ring 16 is shown with a rotating shaft for a vacuum chamber. The ring in this case of thin beryllium copper is in a groove in the thrust collar 55 bolted to the base plate 56. As the higher pressure is outside of the vacuum chamber 57 the slot or mouth opening of the ring faces away from the chamber with one leg of the C engaging a mid-section 58 of the stainless steel shaft while the opposite leg engages the cylindrical surface 59 of the groove in the thrust collar. The friction contact of the ring 16 with the shaft is of minimum permissible area.

What I claim is:

The method of applying a sealing ring having a C-shaped radial section in a recess to prevent loss of pressure in a space between two bodies held together by a plurality of connecting members, said section having two spaced arcuate arms joined together by a back portion and thereby defining a slot in the sealing ring, one of which bodies has a surface against which one curved arm of the C presses when in sealed position and the second member has a similar surface and has also a third surface against which the back of the ring presses when the ring is in sealing position, said method comprising applying a squeeze force to one of the bodies to force the two arms of the ring toward each other, thereby lessening the distance between the slot faces of the ring, said squeeze force being sufficiently great so that at least one of the contacting surfaces is deformed into surface irregularities of the other contacting surface and the back of the ring is brought into at least line contact with the third surface, and then filling the space between the bodies with a fluid under sufficient pressure to increase the pressure at the back of the ring so as to flatten the back of the ring to form a surface contact, said initial squeeze force being greater than the final fluid pressure.

References Cited in the file of this patent

UNITED STATES PATENTS

| | | |
|---|---|---|
| 1,339,636 | Tulloch | May 11, 1920 |
| 2,126,505 | Risser | Aug. 9, 1938 |
| 2,211,983 | Parris | Aug. 20, 1940 |
| 2,783,106 | Barnhart | Feb. 26, 1957 |
| 2,837,360 | Ladd | June 3, 1958 |
| 2,862,775 | Kupiec | Dec. 2, 1958 |
| 2,875,917 | Alkine | Mar. 3, 1959 |

FOREIGN PATENTS

| | | |
|---|---|---|
| 610,973 | France | June 21, 1926 |
| 464,424 | France | Nov. 22, 1913 |